(12) United States Patent
Chir et al.

(10) Patent No.: US 8,833,053 B2
(45) Date of Patent: Sep. 16, 2014

(54) COOLING SYSTEM FOR AN AERO GAS TURBINE ENGINE

(75) Inventors: Adam P Chir, Derby (GB); Andrew M Rolt, Derby (GB)

(73) Assignee: Rolls-Royce PLC, London (GB)

( * ) Notice: Subject to any disclaimer, the term of this patent is extended or adjusted under 35 U.S.C. 154(b) by 951 days.

(21) Appl. No.: 12/704,959

(22) Filed: Feb. 12, 2010

(65) Prior Publication Data
US 2010/0303616 A1    Dec. 2, 2010

(51) Int. Cl.
  F02C 7/08 (2006.01)
  F02G 1/00 (2006.01)
  F02G 3/00 (2006.01)

(52) U.S. Cl.
  USPC ............... 60/39.5; 60/785; 60/782; 60/795

(58) Field of Classification Search
  USPC ............. 60/782, 785, 226.1, 262, 266, 226.3, 60/806, 39.5, 761–766, 231; 415/115; 239/265.17
  See application file for complete search history.

(56) References Cited

U.S. PATENT DOCUMENTS

| | | | |
|---|---|---|---|
| 3,468,473 A * | 9/1969 | Chilman et al. | 415/129 |
| 4,254,618 A | 3/1981 | Elovic | |
| 4,527,388 A * | 7/1985 | Wallace, Jr. | 60/204 |
| 5,184,459 A * | 2/1993 | McAndrews | 60/226.3 |
| 5,581,996 A * | 12/1996 | Koch et al. | 60/782 |
| 5,826,794 A * | 10/1998 | Rudolph | 239/265.17 |
| 7,000,404 B2 * | 2/2006 | Palmisano et al. | 60/782 |
| 7,004,047 B2 * | 2/2006 | Rey et al. | 74/469 |
| 2007/0186535 A1 * | 8/2007 | Powell et al. | 60/226.1 |
| 2007/0234737 A1 | 10/2007 | Vosberg | |
| 2007/0245739 A1 | 10/2007 | Stretton et al. | |

FOREIGN PATENT DOCUMENTS

WO  WO 2008/132426     11/2008
WO  WO 2008/132426 A1  11/2008

OTHER PUBLICATIONS

Jul. 3, 2009 Search Report issued in British Patent Application No. 0903815.9.

* cited by examiner

*Primary Examiner* — Craig Kim
(74) *Attorney, Agent, or Firm* — Oliff PLC

(57) ABSTRACT

A cooling system is provided for an aero gas turbine engine. The system has a duct which diverts a portion of a bypass air stream of the engine. A heat exchanger located in the duct receives cooling air for cooling components of the engine. The cooling air is cooled in the heat exchanger by the diverted bypass air stream. After cooling the cooling air, the spent diverted air stream is routed to a tail cone located at the exit of the engine and ejected through a nozzle at the tail cone.

9 Claims, 6 Drawing Sheets

COOLING SYSTEM FOR AN AERO GAS TURBINE ENGINE

Figure 1:
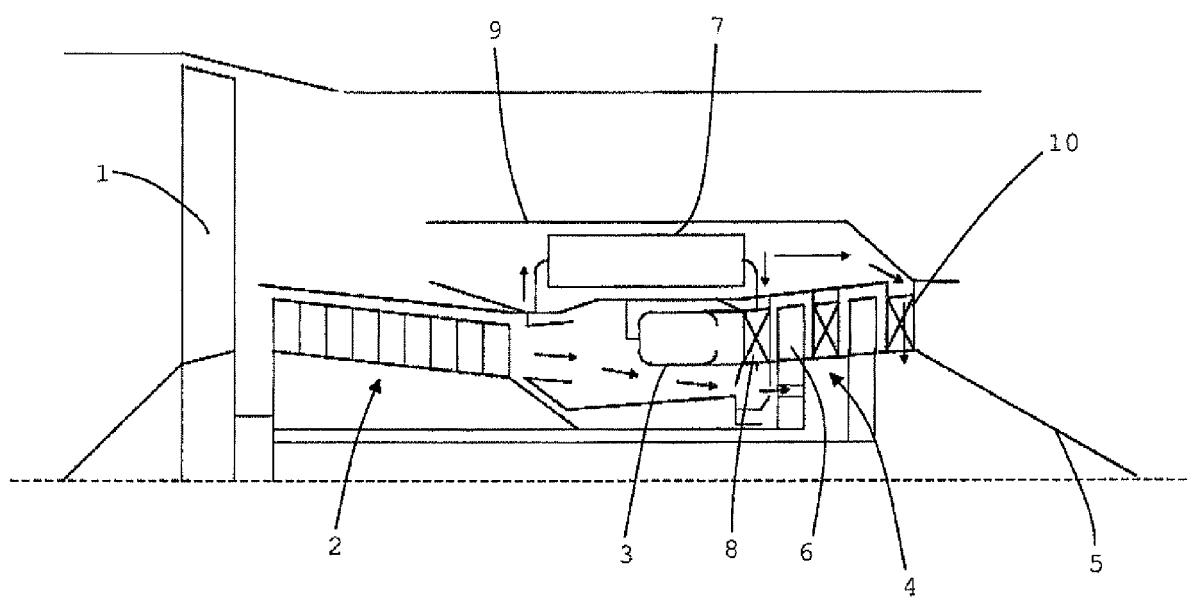

The present invention relates to a cooling system for an aero gas turbine engine.

The high pressure turbine components of an aero gas turbine engine are located in the hottest part of the engine. At around 1600° C., the temperature of the gas stream is greater than the melting temperature of the nickel-based alloys from which the high pressure turbine nozzle guide vanes and rotor blades are typically cast.

It is usual, therefore, to cool nozzle guide vanes and rotor blades internally using cooling air taken from the exit of the high pressure compressor. The cooling air, which bypasses the combustor, may nonetheless be at a temperature of over 700° C. on exit from the compressor section. However, the cooling air, even if returned into the flow path of the turbine downstream of the combustor, does not return a full measure of work to the operation of the turbine. Thus, the greater the amount of cooling air that is extracted, the greater the associated loss in engine efficiency.

One method of reducing the cooling air requirement is to cool the cooling air before it enters the high pressure turbine components. This can be achieved by putting the cooling air in heat exchange relationship with a cooler fluid. For example, many aero gas turbine engines have a bypass air stream which can serve as the cooler fluid. In conventional arrangements, a portion of that air stream is diverted at an offtake into a duct in which the heat exchanger is located. The diverted portion of air, after having passed over the heat exchanger, is then returned to the main bypass air stream.

However, in such conventional arrangements the maximum permissible pressure loss in the air flow through the heat exchanger is limited by the static pressure loss in the main bypass stream between the offtake and the return. That is, by a need to return the diverted flow to the main bypass stream for improved thrust recovery. This limitation results in difficulties in designing compact and lightweight heat exchangers which can provide quantifiable benefits.

Further, to control the amount of cooling, variable area nozzle arrangements may be required in the bypass duct. Such nozzles can have a significant and detrimental impact of engine performance, for example by limiting achievable cooling of the cooling air and by increasing drag for the flow in the bypass duct.

Also the substantially increased temperature of the diverted bypass air when returning to the main bypass stream can cause unacceptably high mixing losses. Indeed, the increased temperature can require material changes to the containment for the bypass stream aft of the point of return of the diverted portion, potentially increasing engine cost and weight.

Accordingly, a first aspect of the present invention provides a cooling system for an aero gas turbine engine, the system having:
a duct which diverts a portion of a bypass air stream of the engine,
a heat exchanger located in the duct which receives cooling air for cooling components of the engine, the cooling air being cooled in the heat exchanger by the diverted bypass air stream, and
a tail cone located at the exit of the engine;
wherein, after cooling the cooling air, the spent diverted air stream is routed to the tail cone and ejected through a nozzle thereat. Typically, the tail cone is located aft of the turbine section of the engine. Typically, the cooling air cools components in the turbine section of the engine, such as nozzle guide vanes and/or rotor blades.

By routing the spent diverted air stream to the tail cone, rather than returning it to the main bypass air stream, problems with conventional cooling systems can be avoided or reduced.

For example, the static pressure at exit from the nozzle at the tail cone will usually be lower than that normally found at the conventional return point of the bypass stream. Thus a greater pressure loss can be tolerated at the heat exchanger, allowing a lighter, more compact and more effective heat exchanger to be used.

The temperature of the spent diverted air stream ejected at the nozzle will also tend to be more closely matched to the temperature of the adjacent exhaust gases leaving the turbine than to the main bypass air stream. Thus mixing losses can be reduced. Further, material changes to the containment for the bypass stream can be avoided. Thrust recovery from the spent diverted air stream can also be improved.

Preferably, the route to the tail cone for the spent diverted air stream passes through hollow outlet guide vanes of the turbine section of the engine. However, alternative or additional flow passages for routing the spent stream can be provided, such as hollow struts downstream of the outlet guide vanes.

Preferably, the tail cone has an arrangement for varying the area of the nozzle. Reducing the nozzle area has the effect of reducing the flow rate in the diverted stream, and hence reducing the heat rejected from the engine core. Further, there is a decrease in the total velocity and pressure loss of the bypass stream. Indeed, variation of the nozzle area can provide an improvement in fan working line and/or reduction in fan flutter at take-off.

The arrangement for varying the area of the nozzle may include a movable plug which controllably blocks the nozzle.

A thermally activated actuation mechanism may vary the nozzle area (e.g. by actuating the movable plug) depending on the temperature of the spent diverted air stream. When the engine is operating under take-off and climb conditions, the temperature of air delivered by the high-pressure compressor is elevated, resulting in a corresponding rise in temperature of the spent diverted air stream. Conversely, when the engine is operating at cruise condition, the temperature of air delivered by the high-pressure compressor is depressed, resulting in a corresponding fall in temperature of the spent diverted air stream. Thus the thermally activated actuation mechanism can operate to increase the nozzle area at high temperatures of the spent diverted air stream (i.e. during take-off and climb when more cooling of the cooling air is required) and to reduce the nozzle area at low temperatures of the spent diverted air stream (i.e. during cruise).

Preferably, the thermally activated actuation mechanism includes one or more elements formed of temperature-dependent shape-memory alloy and/or of bimetallic strip. Advantageously, such elements allow the mechanism to be constructed as a passive device without mechanisms subject to wear and friction which could make the nozzle less reliable.

Typically the nozzle is never completely closed. This means that the spent diverted air stream is always available to appropriately activate the thermally activated actuation mechanism. Possible shape-memory alloys can be alloys of titanium, manganese, iron, aluminium, hafnium, silicon, nickel, copper, zinc, silver, cadmium, indium, tin, lead, thallium or platinum. The expected temperature of the spent diverted air stream is likely to approach 450° C. A nickeltitanium-hafnium shape-memory alloy (e.g. 50 wt % nickel, 25 wt % titanium and 25 wt % hafnium) may be suitable for use at such temperatures.

Alternatively, the nozzle area can be varied by an actuator under the direction of a pilot or an engine management computer system.

The cooling system may further have a separate turbine for extracting work from the spent diverted air stream. For example, the separate turbine can drive a compressor which compresses the cooled cooling air.

A further aspect of the invention provides a gas turbine engine having the cooling system of any one of the previous claims. The engine can be, for example, a high or low bypass turbofan, a turbo-jet, or an open rotor aero engine.

Figure 2:
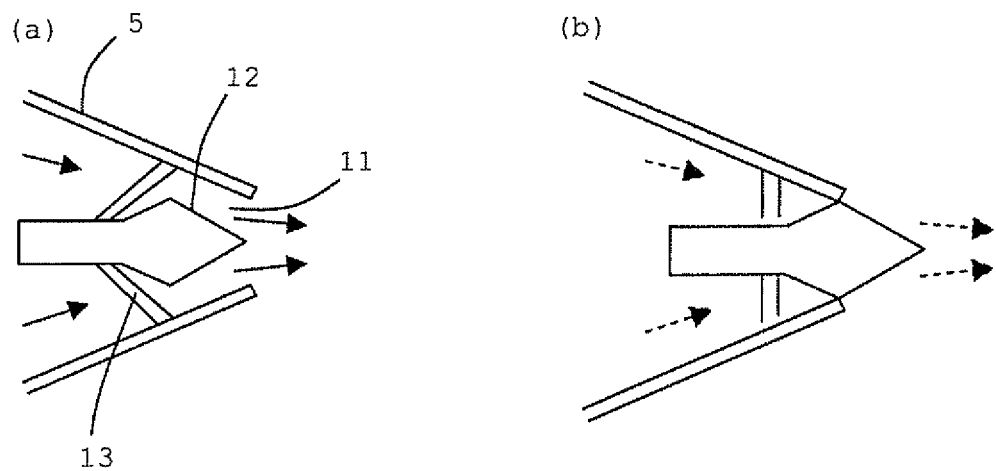
Figure 3:
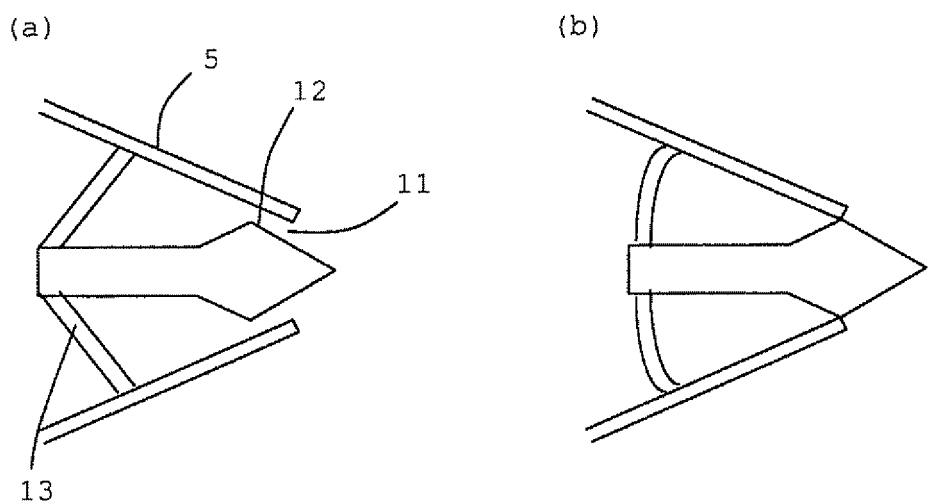
Figure 4:
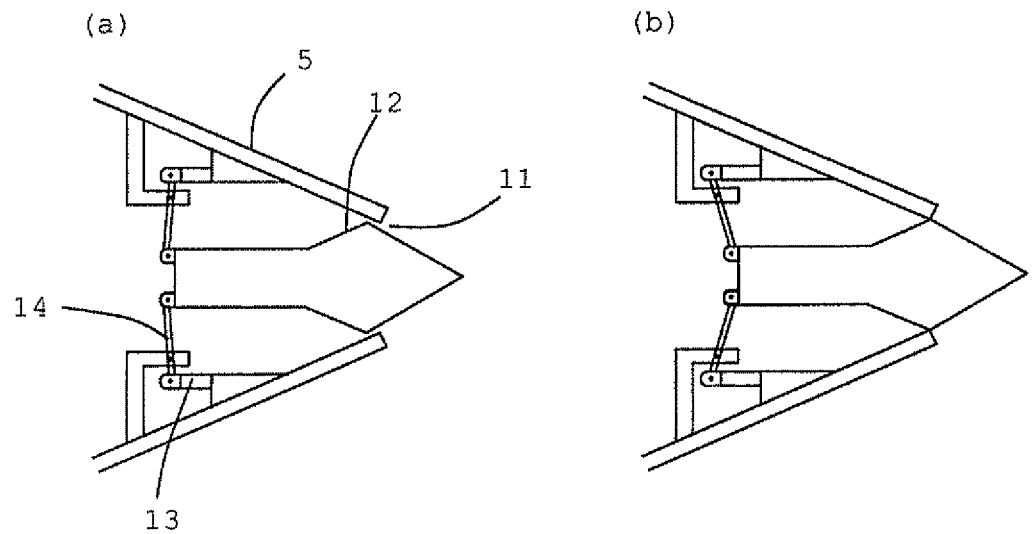
Figure 5:
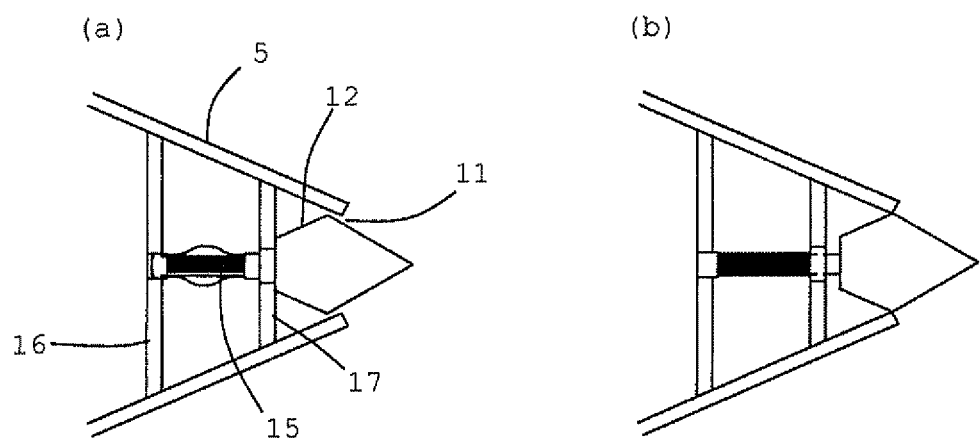
Figure 6:
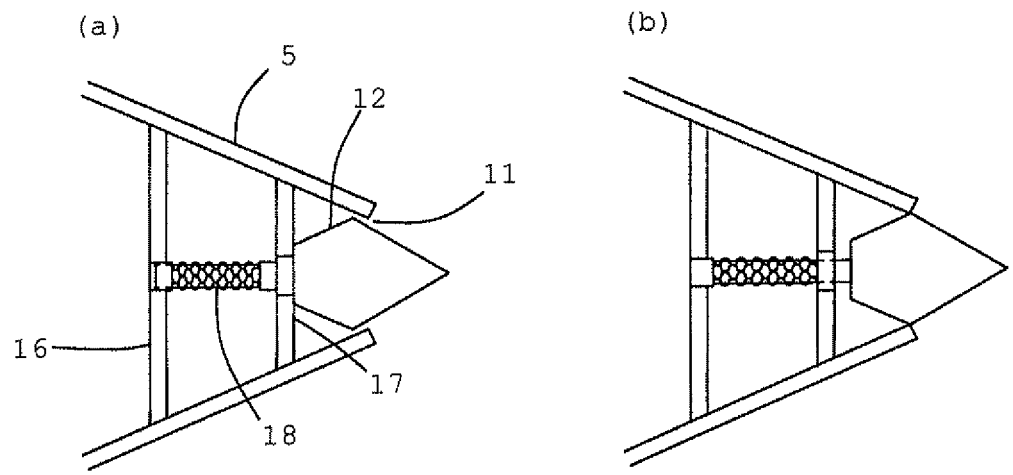
Figure 7:
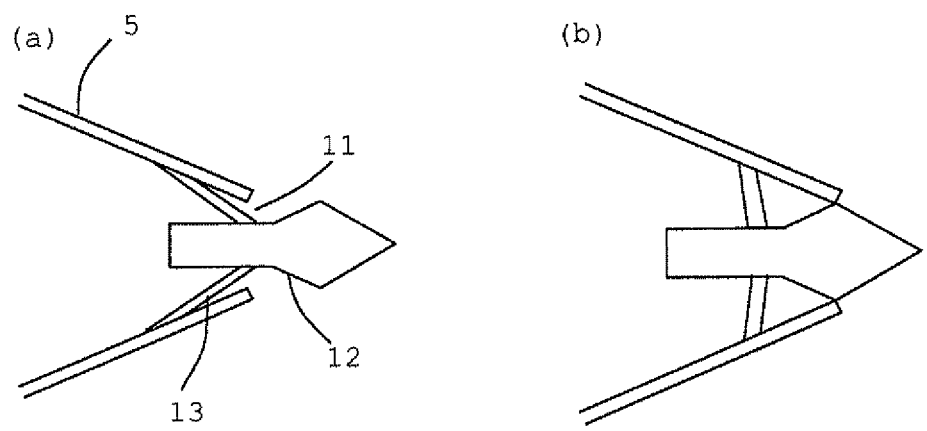
Figure 8:
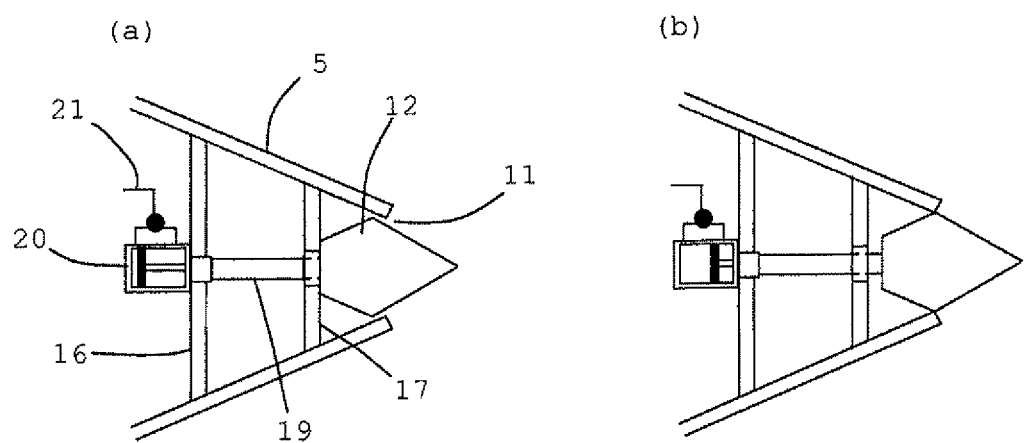
Figure 9:
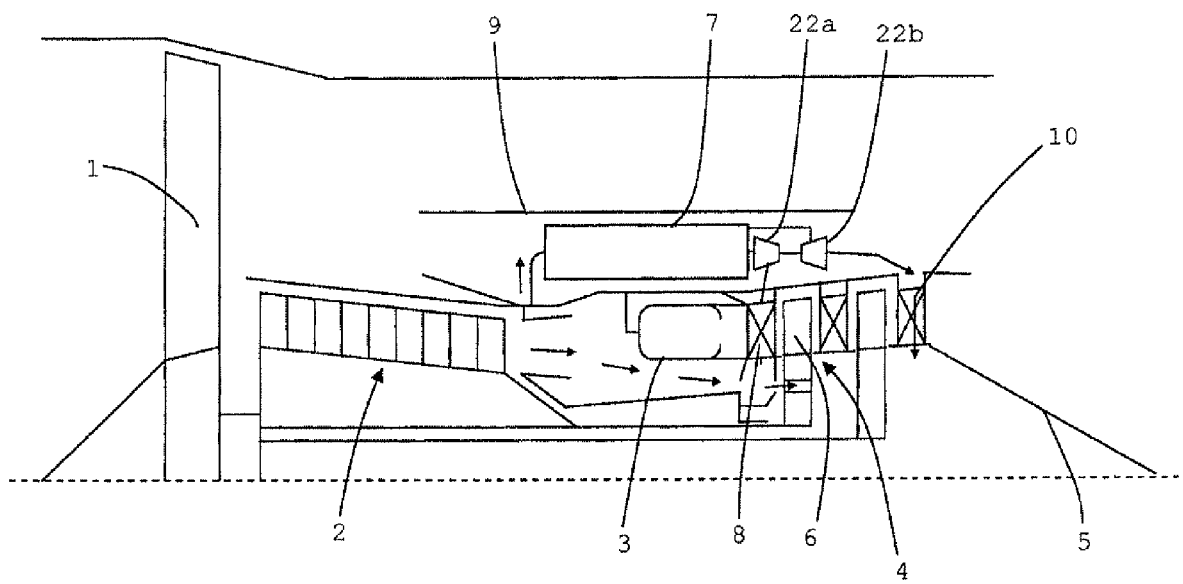

Embodiments of the invention will now be described by way of example with reference to the accompanying drawings in which:

FIG. 1 is a schematic diagram of a cooling system for a high bypass aero gas turbine engine;

FIGS. 2(a) and (b) respectively show open and closed positions of the nozzle for a first embodiment of a tail cone;

FIGS. 3(a) and (b) respectively show open and closed positions of the nozzle for a second embodiment of a tail cone;

FIGS. 4(a) and (b) respectively show open and closed positions of the nozzle for a third embodiment of a tail cone;

FIGS. 5(a) and (b) respectively show open and closed positions of the nozzle for a fourth embodiment of a tail cone;

FIGS. 6(a) and (b) respectively show open and closed positions of the nozzle for a fifth embodiment of a tail cone;

FIGS. 7(a) and (b) respectively show open and closed positions of the nozzle for a sixth embodiment of a tail cone;

FIGS. 8(a) and (b) respectively show open and closed positions of the nozzle for a seventh embodiment of a tail cone; and FIG. 9 is a schematic diagram of a further cooling system for a high bypass aero gas turbine engine having a turbocharger for extracting work from the spent diverted air stream.

FIG. 1 is a schematic diagram of a cooling system for a high bypass turbofan aero engine.

The engine has in flow order a fan 1, a compressor section 2, a combustor 3, a turbine section 4 and a tail cone 5.

A portion of the air from the compressor section 2 is used as cooling air for hot turbine section components and is not sent to the combustor 3. As indicated by arrows, some of this portion is directed inwards towards the high pressure rotor 6 of the turbine section 4, while the rest of the portion is directed outwards to a heat exchanger 7 where it is cooled before being sent to cool the high pressure nozzle guide vanes 8 of the turbine section.

The heat exchanger 7 is located in a duct 9 which diverts a portion of the bypass air stream produced by the fan 1. The diverted air stream cools the cooling air passing through the heat exchanger, and the spent diverted air stream is then routed via hollow outlet guide vanes 10 of the turbine section to the tail cone 5, where it is ejected through a nozzle (not shown in FIG. 1).

FIGS. 2(a) and (b) respectively show open and closed positions of the nozzle 11 for a first embodiment of the tail cone 5. Nozzle has a plug 12, which in moving between the open and closed positions changes the area of the nozzle, and so adjusts the flow rate of the diverted air stream (indicated by arrows). Although in FIG. 2(b) the plus is shown completely closing the nozzle, in reality the closed position still provides a residual flow rate (indicated by dashed arrows) for the diverted air stream.

A thermostatic actuation mechanism based on a plurality of shape memory alloy bands 13 which move the plug in response to the temperature of the spent diverted air stream passing through the nozzle 11, the bands being positioned in the stream. The bands extend between the wall of the tail cone 5 and the plug 12. When the spent diverted air stream is relatively hot and above the transition temperature of the shape memory alloy (e.g. at take-off and landing when the temperature and/or flow rate of the cooling air increases) the bands lengthen, moving the plug away from the nozzle to increase the nozzle area. This encourages a higher flow rate in the diverted air stream, which in turn allows the heat exchanger 7 to cool the cooling air more effectively.

Conversely, when the spent diverted air stream is relatively cool and below the transition temperature of the shape memory alloy (e.g. at cruise when the temperature and/or flow rate of the cooling air reduces) the bands contract, moving the plug towards the nozzle to decrease the nozzle area. This encourages a lower flow rate in the diverted air stream, which allows the engine to extract more useful work from the bypass air stream.

FIGS. 3(a) and (b) respectively show open and closed positions of the nozzle 11 for a second embodiment of the tail cone 5. In this embodiment, the shape memory alloy bands 13 extend between the wall of the tail cone and a position on plug 12 which is further from the nozzle than in the first embodiment. This allows the bands to be longer so that they produce a greater amount of axial movement in the plug when they lengthen and contract.

FIGS. 4(a) and (b) respectively show open and closed positions of the nozzle 11 for a third embodiment of the tail cone 5. In this embodiment, the shape memory alloy bands 13 are smaller and are each connected to one end of a lever 14. The other end of the lever is connected to the plug 12. The levers are arranged such that the lengthening and contraction of the bands is magnified into a larger movement of the plug.

FIGS. 5(a) and (b) respectively show open and closed positions of the nozzle 11 for a fourth embodiment of the tail cone 5. In this embodiment, the plug 12 is moved by a plurality of bimetallic strips 15 which extend from an end of the plug to attach to a transverse strut 16 of the tail cone. The assembly of the strips and the plug is maintained in a centred position relative to the cone and nozzle by the support of a further transverse strut 17, the assembly being movable in the axial direction relative to this strut. The spent diverted air stream passes over the strips. When the stream is relatively hot, the strips bend, reducing the distance between the ends of each strip and moving the plug away from the nozzle. Conversely, when the stream is relatively cold, the strips straighten, moving the plug towards the nozzle.

FIGS. 6(a) and (b) respectively show open and closed positions of the nozzle 11 for a fifth embodiment of the tail cone 5. In this embodiment, the plug 12 is moved by a plurality of sinusoidal shape memory alloy elements 18 which extend from an end of the plug to attach to a transverse strut 16 of the tail cone. The spent diverted air stream passes over the elements. When the stream is relatively hot, the amplitude of the sinusoids increases, reducing the length of each element and moving the plug away from the nozzle, and when the stream is relatively cold, the strips straighten, moving the plug towards the nozzle.

In each of the first to the fifth embodiments described above, the plug 12 is located inboard of the tail cone 5. However, an alternative arrangement is to locate the plug outboard of the cone and to adapt the actuation mechanism so that movement of the plug is in the opposite direction depending on whether the spent diverted air stream is relatively hot or cold. FIGS. 7(a) and (b) respectively show open and closed positions of the nozzle 11 for a sixth embodiment of the tail cone which is similar to the first embodiment of FIGS. 2(a) and (b) except that the shape memory alloy bands 13 are arranged to move the plug in the opposite direction.

In each of the first to the sixth embodiments described above, the actuation mechanism is based on shape memory alloy or bimetallic devices. However, alternatively the actuation mechanism may be driven by e.g. a pneumatic system. For example, FIGS. 8(a) and (b) respectively show open and closed positions of the nozzle 11 for a seventh embodiment of the tail cone 5. An elongate member 19 extends from the plug 12 to attach to the movable element of temperature sensitive switching device 20 (such as WO2008/132426A1 where a passive temperature sensitive flow switching device is based on e.g. changes of magnetic properties at the Curie temperature), the switching device being supported by a transverse strut 16 of the tail cone. Power for the switching device is provided by a pneumatic line 21 connected to a high pressure air source. The assembly of the elongate member and the plug is maintained in a centred position relative to the cone and nozzle by the support of transverse strut 16 and further transverse strut 17, the assembly being movable in the axial direction relative to both struts. The spent diverted air stream passes over the switching device. When the stream is relatively hot, the switching device pulls the plug away from the nozzle, and when the stream is relatively cold, the switching device pushes the plug towards the nozzle.

An advantage of the cooling system and the tail cone embodiments discussed above is that the static pressure at exit from the tail cone is lower than that normally found in the main bypass stream. Therefore, the effectiveness of the heat exchanger 7 can be increased as a greater pressure loss in the diverted bypass stream can be tolerated. Further advantages are that improved thrust recovery from the spent diverted bypass stream can be obtained and mixing losses associated with the ejection of the spent diverted bypass stream reduced.

Thermally activated actuation mechanisms for opening and closing the nozzle 11 of the tail cone 5 can provide a reliable and automatic means for controlling the nozzle area so that the flow rate of the diverted bypass stream is matched to the engine operating condition. Actuation mechanisms based on shape memory alloys or bimetallic strips are particularly attractive as they can simple and robust with few moving parts.

FIG. 9 is a schematic diagram of a further cooling system for a high bypass aero gas turbine engine having a turbocharger for extracting work from a spent diverted air stream. The system is the same as that of FIG. 1, except that the system has a turbocharger with a centrifugal compressor 22a which receives and compresses the cooled cooling air from the heat exchanger and a turbine 22b which uses the spent diverted air stream to drive the centrifugal compressor.

While the invention has been described in conjunction with the exemplary embodiments described above, many equivalent modifications and variations will be apparent to those skilled in the art when given this disclosure. For example, although FIG. 1 shows the cooling system in relation to a high bypass turbofan, the system could also be applied to low bypass turbofan, a turbo-jet, or an open rotor engine. Accordingly, the exemplary embodiments of the invention set forth above are considered to be illustrative and not limiting. Various changes to the described embodiments may be made without departing from the spirit and scope of the invention.

The invention claimed is:

1. A cooling system for an aero gas turbine engine, the system comprising:
    a duct which diverts a portion of a main bypass air stream of the engine to form a diverted bypass air stream, the duct having an inlet and an outlet, the diverted bypass air stream being fluidly separate from the main bypass air stream downstream of the inlet with respect to a flow of the diverted bypass air stream;
    a heat exchanger located in the duct downstream of the inlet and upstream of the outlet, the heat exchanger receiving cooling air for cooling components of the engine, the cooling air being cooled in the heat exchanger by the diverted bypass air stream;
    a turbine section of the engine disposed downstream of the outlet of the duct and being fluidly separate from the main bypass air stream;
    a tail cone located at the exit of the engine; and
    a nozzle located in the tail cone;
    wherein, after cooling the cooling air, the spent diverted air stream exits the outlet of the duct, passes through the turbine section to the tail cone, and is ejected through the nozzle.

2. The cooling system according to claim 1, wherein the route to the tail cone for the spent diverted air stream passes through hollow outlet guide vanes of the turbine section of the engine.

3. The cooling system according to claim 1, wherein the tail cone has an arrangement that is configured to vary the area of the nozzle.

4. The cooling system according to claim 3, wherein the arrangement for varying the area of the nozzle includes a movable plug which controllably blocks the nozzle.

5. The cooling system according to claim 3, wherein the arrangement for varying the area of the nozzle includes a thermally activated actuation mechanism that is configured to vary the nozzle area depending on the temperature of the spent diverted air stream.

6. The cooling system according to claim 5, wherein the thermally activated actuation mechanism includes one or more elements formed of temperature-dependent shape-memory alloy.

7. The cooling system according to claim 5, wherein the thermally activated actuation mechanism includes one or more elements formed of bimetallic strip.

8. The cooling system according to claim 1, further comprising:
    a separate turbine configured to extract work from the spent diverted air stream after the spent diverted air stream has cooled the cooling air.

9. A gas turbine engine comprising the cooling system of claim 1.

* * * * *